Sept. 27, 1966 W. J. BARTIK 3,275,839
PARAMETRIC DEVICE
Filed July 17, 1962

INVENTOR
WILLIAM J. BARTIK

BY

ATTORNEY

United States Patent Office 3,275,839
Patented Sept. 27, 1966

3,275,839
PARAMETRIC DEVICE
William J. Bartik, Jenkintown, Pa., assignor to Sperry Rand Corporation, New York, N.Y., a corporation of Delaware
Filed July 17, 1962, Ser. No. 210,360
9 Claims. (Cl. 307—88)

This invention relates to parametric devices and more particularly to parametric devices of the thin film type.

A parametric circuit generally includes an input circuit and an output circuit each coupled to a reactance member, wherein no direct coupling exists between the input and output circuits. The reactance member is "pumped" by a varying signal applied to the input circuit. The value of the reactance as reflected in the output circuit is thereby varied.

Generally, a parametron is a parametric circuit whereby the reactance that is varied is an inductance. The prior art parametrons include those of the ferrite core type and the thin film type.

One type of prior art parametron includes a copper wire having a thin magnetic film plated about its circumference. The copper wire is connected to a pump source. An output winding is wound around the thin film. The copper wire acts as a primary winding for the pump source; the secondary or output winding is connected to a tuning capacitor to tune the output circuit to a desired frequency. Such a device of the prior art requires a significant amount of power for the pump source; some of this power being unnecessarily dissipated by forming an inductive field in the primary circuit which does not couple to the magnetic thin film on the wire.

It is an object of this invention to provide a novel parametric device wherein the efficiency of the pump power is high.

It is a further object of this invention to provide a novel parametric device whereby the cross-talk between the pump winding and the output winding are minimized.

In accordance with one embodiment of this invention, a parametric device comprises an internal conductor coated with a thin magnetic film which is covered with an insulator. Co-axially surrounding a conductor, film, and insulator is a braided external conductor forming, in effect, a co-axial cable. At one end of the co-axial cable, a pump source is connected to the internal and external conductors. At the other end of the cable, the internal and external conductors are connected together. One or more coils are wound about the exterior of the cable to which tuning condensers are connected to the terminals thereof.

Other objects and advantages of this invention together with its construction and mode of operation, will become more apparent from the following description, when read in conjunction with the accompanying drawings, in which.

Figure 1:
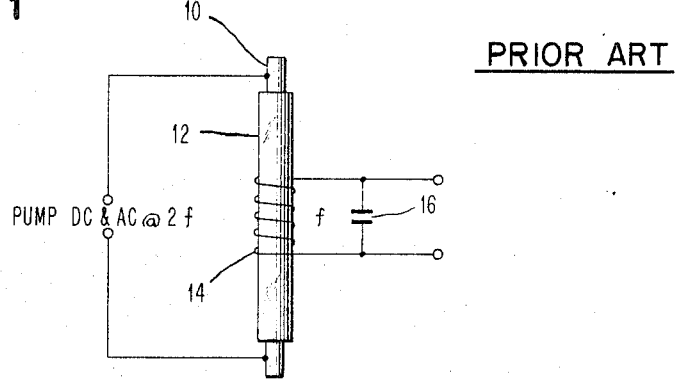
FIGURE 1 is a diagram of a parametric device shown in the prior art.

Referring to FIGURE 1, there is shown a parametric device including a copper wire 10 of approximately 1 mm. in diameter. The copper wire 10 is plated with a thin film 12 of nickel-iron alloy of approximately 1 micron thickness. A secondary winding 14 of 0.08 mm. diameter copper wire is wound about the magnetic film 12 and is connected directly to a secondary tuning capacitor 16 which is tuned to a frequency $f$. A pump signal is applied across the primary winding 10. The pump signal includes a D.C. bias and oscillates at a frequency, such as 10 megacycles. The D.C. bias can be a current of 1 ampere. The pumping frequency is twice the frequency of the output circuit.

The alternating pump current applied to the conductor 10 causes the film 12 to change its state of magnetization in accordance with the pump signal thereby varying the inductance of the coil 14. The cross-talk between the pump "winding" 10 and the output "winding" 14 is small because the fields created by the two windings are orthogonal to each other. Significant power, however, from the pump source is required to overcome the air inductance of the loop of the primary winding.

Figure 2:
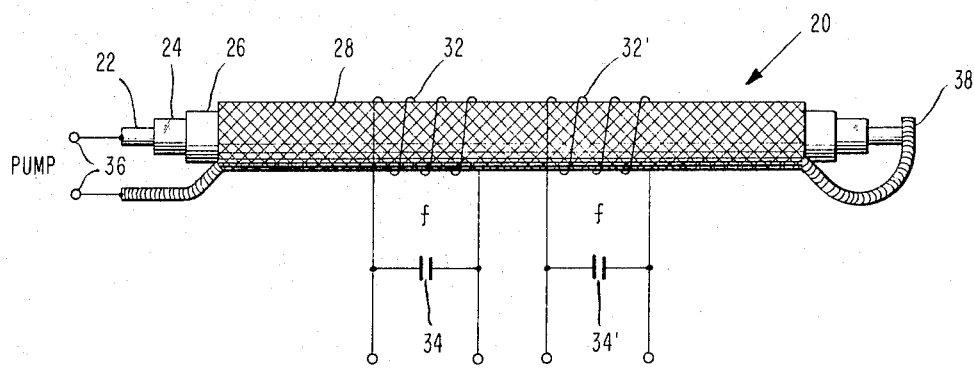
FIGURE 2 is a diagram of a parametric device in accordance with one embodiment of this invention.

Referring to FIGURE 2, there is shown a co-axial cable 20 including an inner conductor 22 on which is plated a thin magnetic film 24. About the magnetically plated inner conductor is an insulator 26. An outer braided conductor 28 co-axially surrounds the conductor 22, film 24 and insulator 26. A plurality of coils 32 and 32' are separately wound about the external conductor 28 with individual capacitors 34, 34' connected to the ends of the windings 32, 32', respectively. A pump source, which may include a bias source, is applied to a pair of terminals 36 which are connected to the inner and outer conductors of the cable 20 at one end thereof (the left as viewed in FIG. 2). At the other end of the cable 20 (at the right of the figure) at point 38, the inner and outer conductors are connected to each other.

The pump power applied to the circuit as shown in FIGURE 2 is minimized. The pump current passes from the pump source through the inner conductor 22 to the right of the cable 20 to point 38 and returns on the external conductor 28 to the pump source. The internal and external conductors comprise a co-axial structure of low impedance, the magnitude of which is determined by the thickness and permeability of the magnetic film and the thickness and permittivity of the insulating layer.

Since the output winding is external to both the pump current flowing in the inner conductor and its return along the outer conductor, the effects of the inner current upon the output winding act to cancel the effects of the outer current upon the output winding. Thus, the output winding experiences no changes due to pump current flowing in the inner and outer conductors, per se.

However, the effects upon the magnetic film due to current flowing in the inner conductor are re-enforced by the current flowing in the outer conductor. The magnetic film experiences its changes in its magnetization due to the pump current, and these changes in its magnetization are recognized by the output winding. The external conductor 28 is braided so that it does not act as a magnetic shield, so that, effectively, the changes in magnetization in the thin film are reflected into the output winding 32.

By utilizing the co-axial path as taught by this invention, a low impedance structure is provided. In addition, a small power to delay ratio is obtained due to efficient coupling to the thin film which causes little energy to be dissipated in creation of a flux which does not pass through the film.

The device described in the prior art, shown in FIGURE 1, has a small amount cross-talk because the input and output fields are orthogonal to each other. However, with a device as taught by practicing the instant invention, the cross-talk between the pump circuit and the output circuit is several orders of magnitude smaller than the device taught in the prior art. In addition to the input and output circuits having orthogonal fields, the orthogonality is re-enforced because the output winding sees a zero M.M.F. as far as the pump is concerned, because the output winding sees both the central current and the return current in the external conductor which currents are opposite in direction and equal in magnitude to each other.

The device described can be used in parametron type logic circuits wherein a controlled phase source (0 or $\pi$ phase at the tank frequency) can be coupled to the output circuit by known techniques; for example, transformer coupling. However, the device as taught by this invention is not limited to parametrons but is useful in various types of parametrically excited circuitry.

A plurality of output circuits 32, 32'; 34, 34' can be separately coupled to the cable 20 to provide a plurality of output circuits with the same pump source.

The embodiments of the invention in which an exclusive property or privilege is claimed are defined as follows:

1. A parametric device comprising:
   (a) an inner conductor plated with a thin magnetic film in the order of one micron;
   (b) an insulator covering said plated inner conductor;
   (c) and an external braided conductor co-axially surrounding said insulator.

2. A parametric device comprising:
   (a) an inner conductor plated with a thin magnetic film;
   (b) an insulator covering said plated inner conductor;
   (c) an external braided conductor co-axially surrounding said insulator;
   (d) and an output winding wound about the external conductor.

3. A device as claimed in claim 2 including a tuning capacitor connected to said output winding.

4. A parametric device comprising:
   (a) an inner conductor plated with a thin magnetic film;
   (b) an insulator covering said plated inner conductor;
   (c) an external braided conductor co-axially surrounding said insulator;
   (d) and a plurality of output windings wound about said external conductor, each of the output windings including a separate capacitor connected thereto.

5. A parametric device comprising:
   (a) an innter conductor plated with a thin magnetic film;
   (b) an insulator covering said plated inner conductor;
   (c) and an external braided conductor co-axially surrounding said insulator, said external conductor is electrically connected to said inner conductor.

6. A device as claimed in claim 2 wherein said external conductor is electrically connected to said inner conductor.

7. A device as claimed in claim 3 wherein said external conductor is electrically connected to said inner conductor.

8. A device as claimed in claim 4 wherein said external conductor is electrically connected to said inner conductor.

9. A paramertic circuit comprising
   (a) a co-axial cable including
      (1) an inner conductor plated with a thin magnetic film,
      (2) an insulator covering said plated inner conductor, and
      (3) an external braided conductor co-axially surrounding said insulator;
   (b) a pair of terminals adapted to receive a pump source having an alternating frequency component of $2f$;
   (c) means connecting said inner conductor and said external conductor, at one end of said cable, to said pair of terminals;
   (d) means connecting said inner conductor and said external conductor at the other end of said cable, to each other;
   (e) an output winding wound about said external conductor; and
   (f) a tuning capacitor connected to said output winding, said output winding and capacitor forming a tuned circuit resonant at a frequency $f$.

References Cited by the Examiner
UNITED STATES PATENTS

| | | | |
|---|---|---|---|
| 2,854,640 | 9/1958 | Nordlin | 174—102 X |
| 2,998,840 | 9/1961 | Davis | 340—174 |
| 3,051,891 | 8/1962 | Jorgensen | 334—11 X |
| 3,239,754 | 3/1966 | Odom et al. | 340—174 X |

References Cited by the Applicant
UNITED STATES PATENTS

| | | |
|---|---|---|
| 3,227,890 | 1/1966 | Lo et al. |

OTHER REFERENCES
Lansdorf, Abstract 212,266 June 30, 1953, 323–89.

BERNARD KONICK, *Primary Examiner.*

H. K. SAALBACH, *Examiner.*

D. VOLK, R. F. HUNT, J. MOFFITT,
*Assistant Examiners.*